(12) United States Patent
Mierswa

(10) Patent No.: US 8,157,971 B2
(45) Date of Patent: Apr. 17, 2012

(54) ELECTRONIC POOL WATER TREATMENT SYSTEM

(76) Inventor: Sven Mierswa, Nuevo Guaymas (MX)

( * ) Notice: Subject to any disclaimer, the term of this patent is extended or adjusted under 35 U.S.C. 154(b) by 1167 days.

(21) Appl. No.: 11/698,399

(22) Filed: Jan. 27, 2007

(65) Prior Publication Data
US 2008/0128292 A1    Jun. 5, 2008

Related U.S. Application Data

(63) Continuation-in-part of application No. 11/606,794, filed on Nov. 30, 2006.

(51) Int. Cl.
*C02F 1/461* (2006.01)
(52) U.S. Cl. ............... 204/230.2; 204/275.1; 210/748.1
(58) Field of Classification Search .................. 204/149, 204/228.6, 230.2, 272, 274–275.1; 210/696, 210/748; 205/743
See application file for complete search history.

(56) References Cited

U.S. PATENT DOCUMENTS

| | | | | |
|---|---|---|---|---|
| 4,938,875 | A | * | 7/1990 | Niessen .................. 210/695 |
| 5,328,574 | A | * | 7/1994 | Mercier .................. 205/744 |
| 2006/0137996 | A1 | | 6/2006 | Mierswa |
| 2007/0138104 | A1 | * | 6/2007 | Elgressy ................. 210/696 |
| 2008/0128282 | A1 | * | 6/2008 | Mierswa ................. 204/554 |

FOREIGN PATENT DOCUMENTS

DE    19502588    4/1996

OTHER PUBLICATIONS

Blue Water Technologies, What is Amp Force Technology? pp. 2 of 3 and 3 of 3 (p. 1 blank except for header and footer) Obtained from http://ampforce.com/ website on Jun. 24, 2008 (presumably published earlier).
Blue Water Technologies, Basic Facts About Patents pp. 2 of 4, 3 of 4 and 4 of 4 (p. 1 blank except for header and footer) Obtained from http://ampforce.com/basic_facts_about_patent.html website on Jun. 24, 2008 (presumably published earlier).
Blue Water Technologies, Summary, p. 2 of 2 (p. 1 blank except for header and footer) Obtained from http://ampforce.com/summary.html website on Jun. 24, 2008 (presumably published earlier).
Blue Water Technologies, Retraction Letter, pp. 2 of 3 and 3 of 3 (p. 1 blank except for header and footer) Obtained from http://ampforce.com/contact_Us.html website on Jun. 24, 2008 (presumably published earlier).

* cited by examiner

*Primary Examiner* — Kaj K Olsen
*Assistant Examiner* — Susan Leong
(74) *Attorney, Agent, or Firm* — Barbara J. Luther; The Luther Law Firm, PLC

(57) ABSTRACT

An electronic water treatment apparatus includes an electronic impulse generator and control box attached to a power source. An impulse chamber includes a cylindrical anode rod inside a tubular cathode and is connected to the impulse generator and control box with a low-voltage cable which is no more than about six feet long. The impulse generator and control box supply about 16 v DC power and 120-180 milliamps to the impulse chamber at between 2300 and 5200 Hertz. The discharge frequency within the impulse chamber automatically varies with the conductivity of the aqueous solution within the impulse chamber. The impulse generator and control box supply power with a waveform that includes about a two microsecond break between each positive and negative pulse to prevent corrosion of the electrodes and create the aragonite form of calcium carbonate instead of the calcite form.

8 Claims, 3 Drawing Sheets

ELECTRONIC POOL WATER TREATMENT SYSTEM

PRIORITY DATA

This application is a continuation-in-part of U.S. patent application Ser. No. 11/606,794, filed on 30 Nov. 2006.

FIELD OF THE INVENTION

This invention relates generally to devices for treating hard water, and more specifically to a system that controls the crystal structure of calcium compounds in water.

BACKGROUND

Swimming pools, spas, fountains and bath fixtures have a common enemy: hard water deposits. Water hardness is caused by calcium and magnesium compounds and ions in the water. These ions cause two major kinds of problems. The metal ions react with soaps and calcium sensitive detergents, hindering their ability to lather properly and forming an unsightly precipitate—the familiar scum or "bathtub ring". In addition, the presence of these ions also inhibits the cleaning effect of detergent formulations. More seriously, calcium and magnesium carbonates tend to adhere to the interior surfaces of pipes and heat exchanger surfaces. The resulting scale buildup can restrict water flow in pipes. In boilers, the deposits act as thermal insulation that impedes the flow of heat into the water. This not only reduces heating efficiency, but allows the metal to overheat which, in a pressurized system, can lead to failure. Though not hazardous, these hard water deposits can destroy the fine finish of tile and other decorative pool and fountain materials. The damage is usually caused by harsh removal procedures. A de-scaling agent is a solution to remove limescale, e.g. from water taps, kettles, toilets, water pipes and tile. De-scaling agents usually contain an acid as the active ingredient, such as acetic acid, lactic acid, citric acid, phosphoric acid, or hydrochloric acid. These solutions can be quite harsh over time. The best way to eliminate the damages from hard water is to treat the water so that the hard water deposits cannot form in the first place.

In the past, the only ways to control hard water were chemical processes. Conventional water-softening devices intended for household use depend on an ion-exchange resin in which the calcium and magnesium ions in the hard water trade places with sodium ions that are electrostatically bound to the anionic functional groups of the polymeric resin. Such procedures use a lot of sodium, which goes into the wastewater system. This sodium is not good for wastewater systems. Some municipalities restrict the use of sodium-based systems. A class of minerals known as zeolites also exhibits ion-exchange properties and were widely used in earlier water softeners.

DESCRIPTION OF PRIOR ART

Hardwater issues involve basic chemistry. Calcite is the enemy. Calcite is a hexagonal-rhombohedral crystal of $CaCO_3$, or calcium carbonate. It is very insoluble in aqueous solutions. Calcium bicarbonate ($Ca(HCO_3)_2$), also called calcium hydrogen carbonate, is a compound which exists only in aqueous solution. Calcium bicarbonate is formed when water containing carbon dioxide in solution (also known as carbonic acid) reacts with calcium carbonate.

As the solution evaporates or as its temperature increases, the following reaction occurs: $Ca(HCO_3)_2(aq) \rightarrow CO_2(g) + H_2O(l) + CaCO_3(s)$. Water and carbon dioxide from the calcium bicarbonate are released to leave solid calcite behind.

This reaction is very important to the formation of hard water deposits, including the formation of such things as stalactites, stalagmites, limestone, marble and seashells. As a solution containing calcium bicarbonate, which is very water soluble, dries, or upon a rise in temperature, the excess carbon dioxide is released from the solution of the calcium bicarbonate, causing the much less soluble calcium carbonate-calcite-to be deposited.

The reaction is very temperature sensitive, with a rise in temperature easily driving carbon dioxide out of the calcium bicarbonate solution. Thus, heated pools, spas and bathing areas with elevated temperatures and perpetually damp, or continually wet and dry, areas are especially at risk for calcite deposits.

Alternative forms of water treatment used to be the exception, and now have become the rule for swimming pool maintenance. With the inception of salt-water chlorine generators and other non-chemical forms of water treatment, many pool builders and service providers have found these alternative forms as the best way to maintain pools and treat water for the destructive effects of hard water without expensive and noxious maintenance procedures. By treating the water in this manner, a conditioning effect occurs that can be felt on the skin and in the hair, and can be seen in the overall clarity of the water.

Some electromagnetic processes act to try to precipitate the calcium compounds from the water. This can be a tall order in very hard water and requires that the calcium precipitates be removed from the water and disposed. This process thus requires a lot of effort and energy.

Thus, there exists a need for a water treatment system that destroys the undesirable hardness qualities of aqueous calcium ions and compounds without creating a precipitate that must be removed.

OBJECTS OF THE INVENTION

According to the present invention there is provided a device to convert calcium bicarbonate into the aragonite form of calcium carbonate ($CaCO_3$) using high frequency electrical impulses. Aragonite is the same molecule as calcite, but has an orthorhombic crystal shape and is a slightly more soluble form of $CaCO_3$ than calcite.

Aragonite is stable at temperatures associated with water systems and does not adhere to surfaces in a scaling manner like calcite does. The aragonite crystals are also a natural pH balancer. The goal of this system is to prevent the formation of calcite deposits. Thus, this system was developed to create aragonite before calcite has an opportunity to form, precipitate or deposit.

SUMMARY

In accordance with the present invention, an electronic water treatment apparatus is provided that includes an electronic impulse generator and control box attached to a power source. The impulse chamber includes a cylindrical anode rod inside a tubular cathode and is connected to the impulse generator and control box with a low-voltage cable which is no more than about six feet long. The impulse generator and control box supply about 16 v DC power and about 120-180 milliamps to the impulse chamber at between 2300 and 5200 Hertz. The discharge frequency within the impulse chamber automatically varies with the conductivity of the aqueous solution within the impulse chamber. The impulse generator and control box supply power with a waveform that includes about a two microsecond break between each positive and negative pulse.

The electronic water treatment system operates by discharging a plurality of electrical pulses through an aqueous solution containing calcium bicarbonate, and varying the discharge frequency of the electrical pulses based upon the conductivity level of the aqueous solution. The discharge frequency is varied automatically. The discharge frequency is between 2300 and 5200 Hertz, with 3125 to 4250 Hz being a more typical range. Each frequency cycle comprises a positive pulse and a negative pulse separated by a break of about two microseconds. In performing this operation, hydrogen is released from the aqueous solution containing calcium bicarbonate and the aragonite form of calcium carbonate is formed instead of calcite.

DETAILED DESCRIPTION OF THE DRAWINGS

Figure 1:
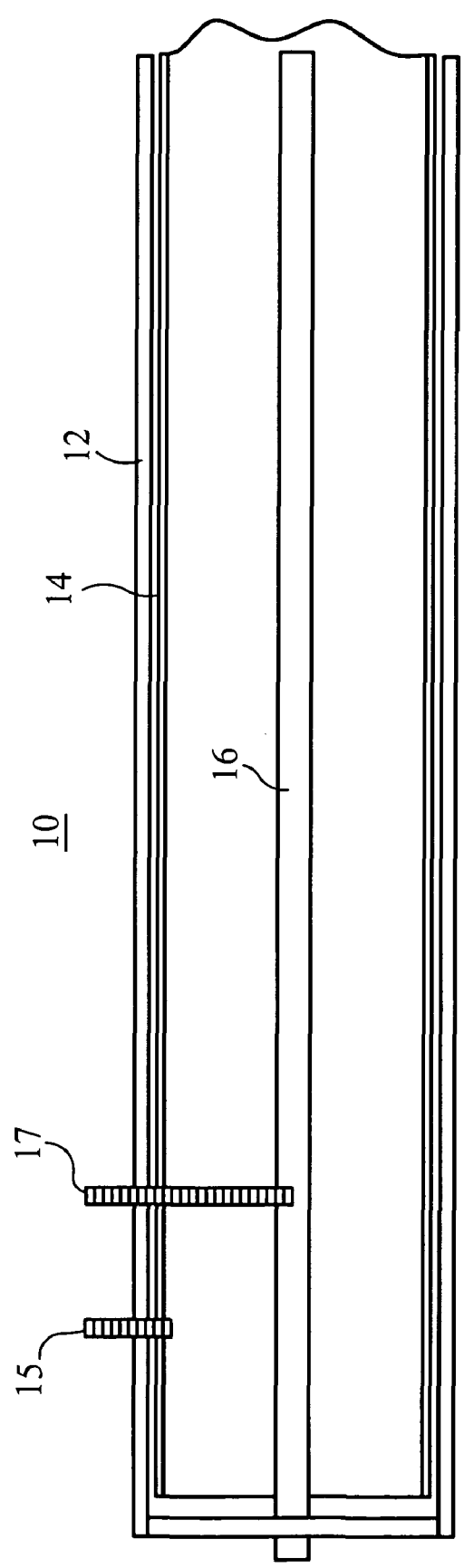
FIG. 1 shows a plan view of an impulse chamber for an electronic water treatment system, in accordance with the invention.

FIG. 1 shows a plan view of an impulse chamber for an electronic water treatment system 10 which includes a generally cylindrical housing or impulse chamber 12. The housing 12 is open on each end to create a tube. A tubular cathode 14 is inside the housing 12 and a rod-shaped anode 16 is centered inside the cathode 14. In one embodiment, the housing 12 is about 395 mm in length, the cathode 14 is about 383 mm long and the anode 16 is about 405 mm long. The outside of the housing 12 is made from an inert, nonconductive material, such as CPVC plastic.

The anode 16 is slightly longer and protrudes slightly from the housing 12 at one end. Power to the cathode 14 is provided at a cathode terminal 15. Power to the anode 16 is provided at an anode terminal 17. Both terminals 15, 17 are shown entering the impulse chamber from the side. Both the cathode 14 and the anode 16 are made from 304/316 stainless steel. The impulse chamber 12 includes fittings at each end so that it can be connected into a plumbing system for a pool, house or other desired location.

Figure 2:
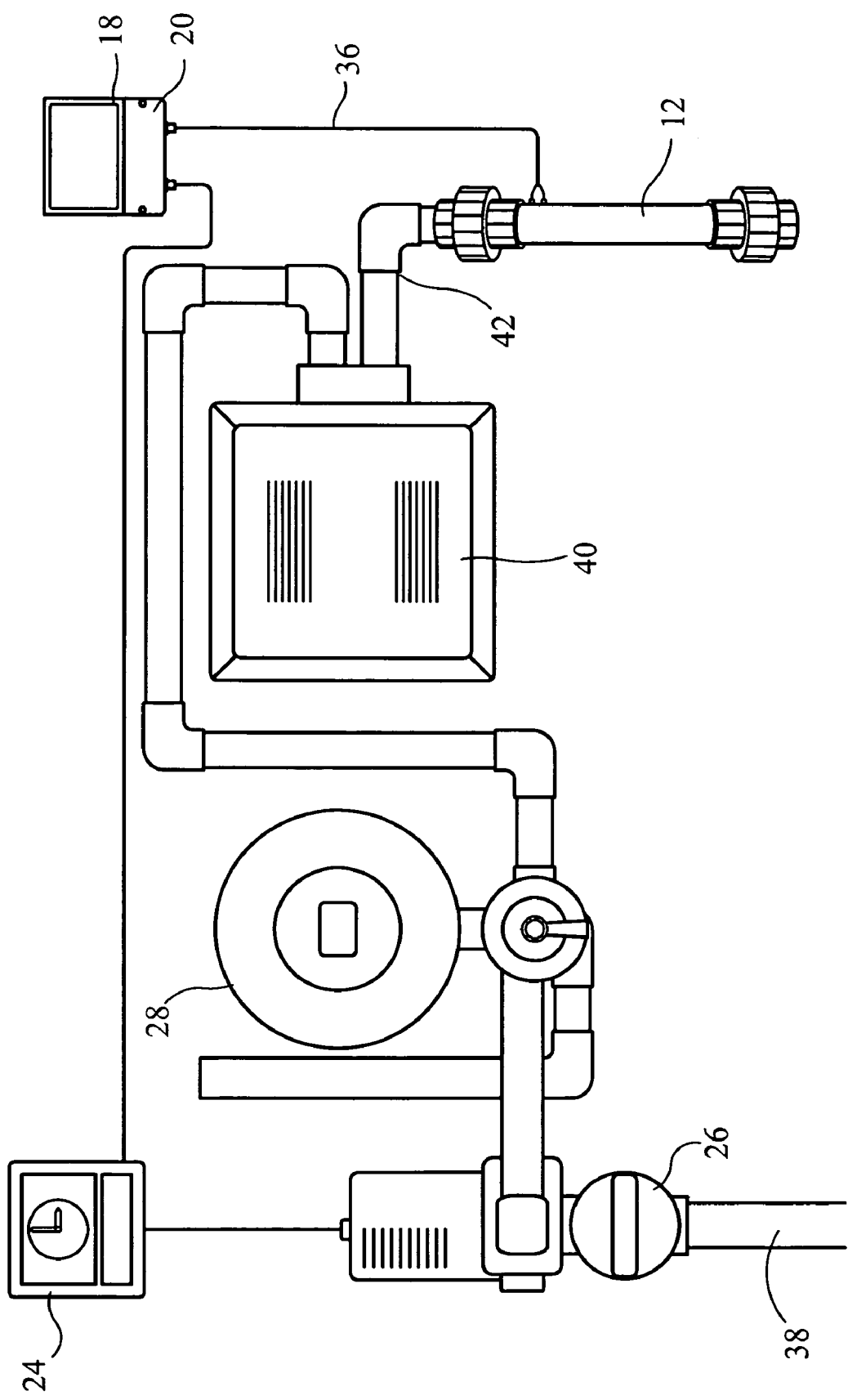
FIG. 2 shows a layout of an electronic water treatment system, in accordance with the invention.

As shown in FIG. 2, a control box 18 includes an impulse generator 20 which is wired to the anode 16 and cathode 14. The control box 18 and impulse generator 20 are connected to a power source 22. In the example of a swimming pool installation, the power source 22 may be connected to and controlled by the timer 24 that also controls water filter 28 operation. 220 v AC power is commonly available in most locations, and can be stepped down to 25 v DC, and then to 16 v DC for use by the impulse generator 20.

Ultimately, the impulse generator 20 creates pulses of about 3125 Hz @ 120-180 mA in the chamber 12, however, the pulses can be 3125-4250 Hz depending on the conductivity of the water. The conductivity of the water is simply the inverse of its electrical resistance. The higher the conductivity of the water, the lower the frequency that will be used in the impulse chamber. Conversely, the lower the conductivity, the higher the frequency. This is controlled automatically.

An earlier configuration of the electronic water treatment system relied upon a 70 mA power supply. Early use of the system seemed to show that 70 millamps would deliver the expected performance for the process to operate efficiently. However, further refinements have shown that more power is required to make the water treatment system function at an optimal level. This was not expected. However, through testing, it was found that 120-180 milliamps is optimal for the electronic water treatment system as it is understood.

Figure 3:
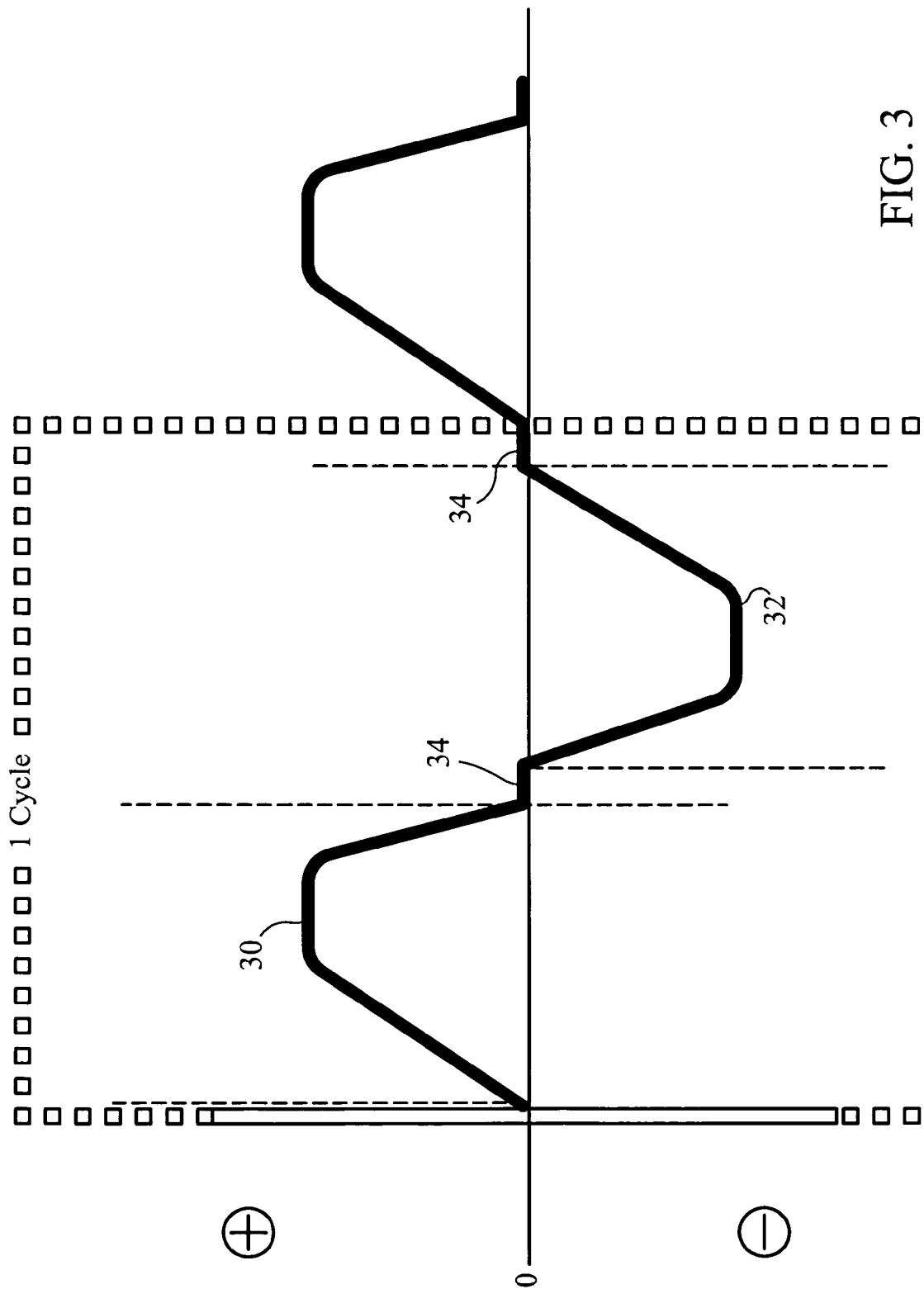
FIG. 3 shows an impulse waveform for an electronic water treatment system, in accordance with the invention.

FIG. 3 provides an example of the impulse timing. The impulse generator 20 creates alternating 16 v positive 30 and negative 32 pulses for about 158 microseconds each, at 3.125 KHz, with a 2 microsecond break 34 in between each positive 30 and negative 32 pulse. As discussed earlier, the durations of the positive 30 and negative 32 pulses will vary depending on the conductivity of the water.

The anode 16 and cathode 14 are attached to control box 18 circuitry by low voltage wires 36, which should be no more than 6 feet, or two meters, for proper operation. This prevents the frequency overlap which would occur in a longer cable. Thus, the chamber 12 is no more than 6 feet from control box 18 and impulse generator 20.

As mentioned above, both the anode 16 and cathode 14 are made from 304/316 stainless steel, which provides chlorine resistance to 1000 mg/l. Regardless of the chlorine resistance properties, uncontrolled AC impulses between the anode 16 and cathode 14 will cause corrosion in the stainless steel. This is a common problem in the industry. The two microsecond breaks 34 between positive 30 and negative 32 impulses eliminate the chance of a corrosion problem.

In swimming pool applications, the system 10 will include a water filter pump 26 that is attached to the pool via water intake plumbing 38. A timer 24 tells the pump 26 when to run and for how long. Optimally, the timer 24 is attached to control box 18 and the impulse generator 20 so that the control box 18 and the impulse generator 20 run only when pump 26 is circulating water. The pump 26 directs intake water to a water filter 28 and water heater 40 and then to the water output plumbing, which includes a return line 42 to the pool 44. The impulse chamber 12 is in line with return line 42.

Operation

The impulse generator 20 produces electrical impulses to preemptively create the aragonite form of $CaCO_3$ in water that contains calcium bicarbonate ($Ca(HCO_3)_2$). Doing so prevents the formation of the calcite form of $CaCO_3$, which is commonly known as scale or lime. Aragonite does not exhibit the strong scaling tendencies of calcite and is thus preferred. Aragonite is much easier to remove from surfaces and can be removed with only a brush in many cases.

The impulse generator 20 operates optimally at 3000 to 5000 Hz, but some positive benefits are exhibited from 2300 to 5200 Hz. The most common operating parameters are at 3125 to 4250 Hz, depending on the conductivity of the water. The generated pulses are discharged between the anode 16 and cathode 14 of the impulse chamber 12 at about 16 v DC and about 120-180 mA.

FIG. 3 shows an appropriate impulse waveform 46 for creating aragonite from a solution containing calcium bicarbonate. A 16 v positive pulse 30 for about 158 microseconds is followed by a two microsecond break 34. This is immediately followed by a 16 v negative pulse 32 for about 158 microseconds with another two microsecond break 34. This particular example is for a pulse frequency of 3125 Hz. A 116 microsecond pulse pattern with two microsecond breaks equals about 4250 Hz.

The impulses are transmitted through the water medium inside the impulse chamber 12 between the anode 16 and cathode 14. This process is a localized electrolysis process and releases hydrogen from the calcium bicarbonate (Ca(HCO$_3$)$_2$) in solution.

As the bicarbonate breaks down, carbon dioxide (CO$_2$) is released, leaving the aragonite form of calcium carbonate (CaCO$_3$).

This simple change in crystal shape means that the CaCO$_3$ does not form scale as calcite does.

The success of the system depends on normal pool operation requirements, such as a weekly maintenance routine to keep water parameters in line. Overall calcium hardness of the water should be kept to within 200-400 ppm. Of course, this can be dependent on the source of the water. Private wells can be significantly different from a municipal water source, etc. . . . The age and wear of swimming pool surfaces, or bathtub and tile, can affect its tendency to collect calcite scale as well.

Water chemical maintenance must keep the pH balanced between 7.4-7.6, optimally, with an alkalinity of 80-120 ppm. This regimen ensures that the other pool chemicals can function properly.

Seasonal temperatures can also affect the pool system. Remember that higher temperatures means that carbon dioxide is released more quickly, thus creating calcite more quickly. The filtering cycle must be monitored as well. Clean water is much easier to maintain in all other aspects.

Porous surfaces (i.e., rock fixtures) around spillways and at pool water level need to be brushed regularly, especially at the water line, including spillways, water features and troubled areas. Brushing will remove the non-scaling aragonite calcium carbonate (CaCO$_3$) easily, without the use of acids or other chemicals, which are required to remove calcite calcium carbonate (CaCO$_3$).

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An electronic water treatment apparatus, comprising: an electronic impulse generator and control box attached to a power source, wherein the electronic impulse generator and control box are configured to supply power with a waveform that includes a series of alternating positive and negative pulses with a two microsecond break between each positive and negative pulse; and an impulse chamber connected to the impulse generator and control box with a low-voltage cable, the impulse chamber including a steel cylindrical anode inside a steel tubular cathode and a fitting at each end of the cathode, the fittings for connection into a plumbing system.

2. The electronic water treatment apparatus of claim 1, where the low voltage cable has a length of no more than six feet.

3. The electronic water treatment apparatus of claim 1, where the impulse generator and control box supply about 16 V DC power to the electronic impulse chamber.

4. The electronic water treatment apparatus of claim 1, where the impulse generator and control box supply between about 120-180 milliamps to the electronic impulse chamber.

5. The electronic water treatment apparatus of claim 1, where the impulse generator and control box supply power to the electronic impulse chamber at between 3000 and 5000 Hertz.

6. The electronic water treatment apparatus of claim 1, where the impulse generator and control box supply power to the electronic impulse chamber at between 2300 and 5200 Hertz.

7. The electronic water treatment apparatus of claim 1, where the impulse generator and control box supply power to the electronic impulse chamber at between 3125 and 4250 Hertz.

8. The electronic water treatment apparatus of claim 1, where the power from the impulse generator and control box to the electronic impulse chamber varies with a conductivity of an aqueous solution within the impulse chamber.

* * * * *